A. E. RUSSELL & W. G. CHARLEY.
HUB OF VEHICLE WHEELS.
APPLICATION FILED OCT. 29, 1915.
1,268,629.
Patented June 4, 1918.
2 SHEETS—SHEET 1.
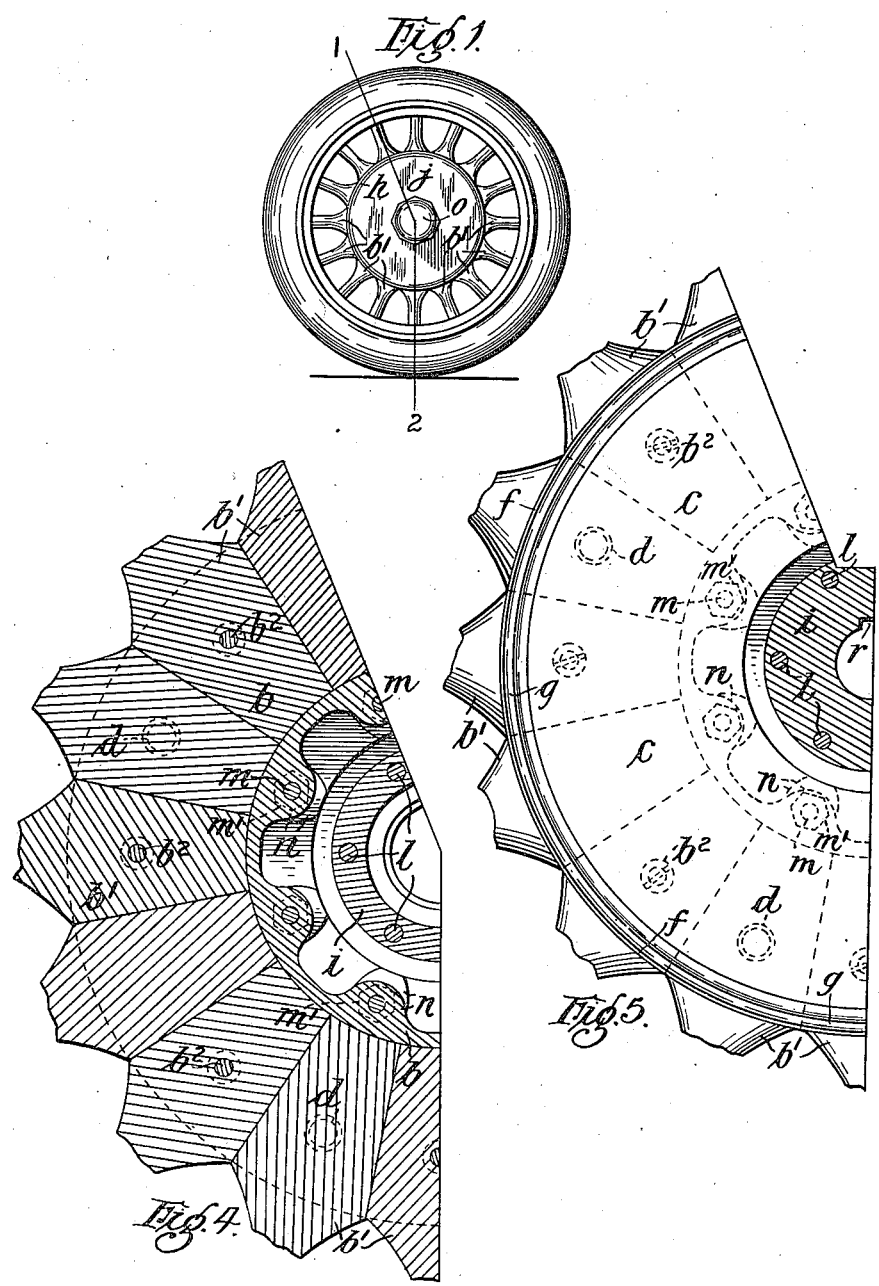
A. E. Russell.
W. G. Charley.
Inventor.
By [signature]
Attorney.

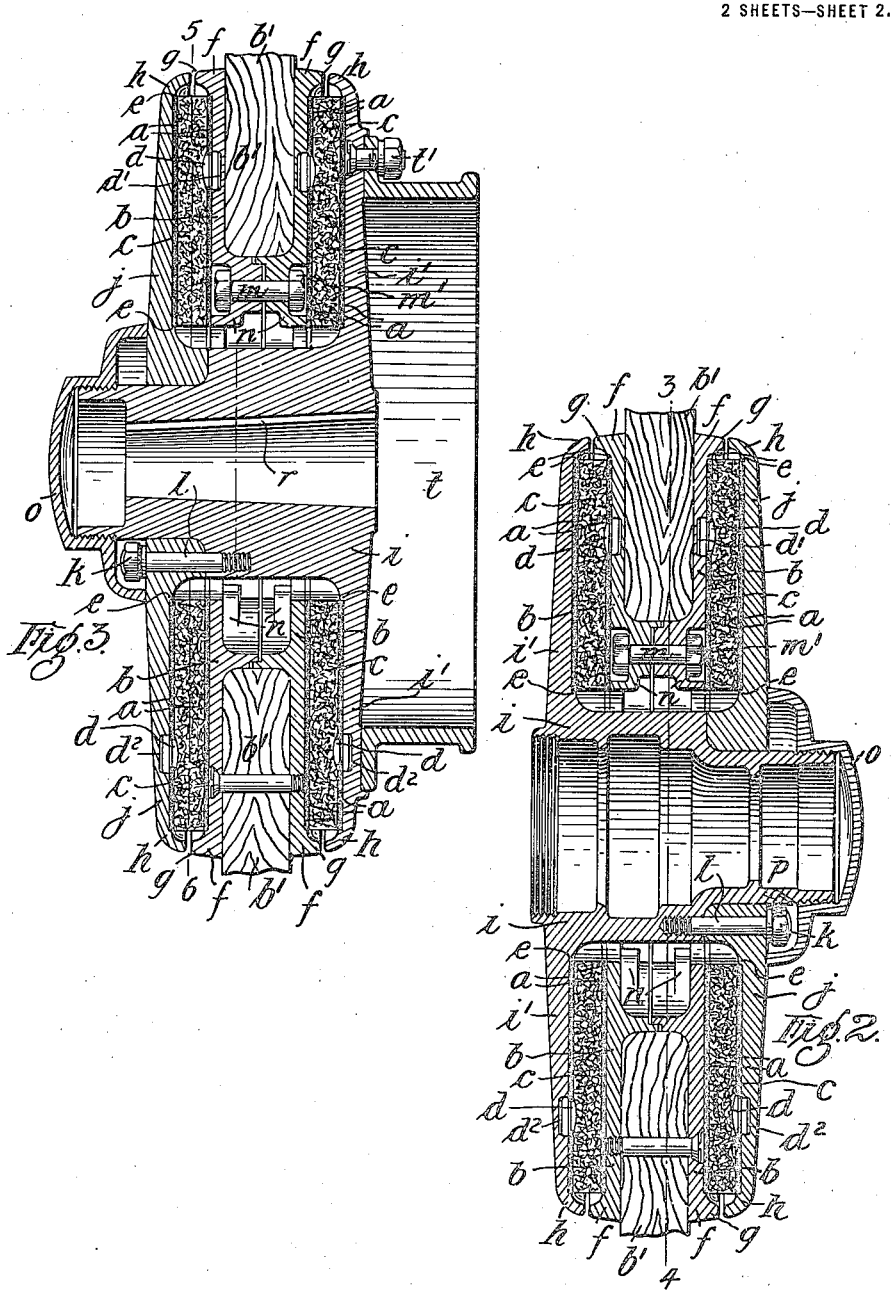

UNITED STATES PATENT OFFICE.

ALBERT EDWARD RUSSELL, OF WINDSOR, AND WALTER GEORGE CHARLEY, OF MELBOURNE, VICTORIA, AUSTRALIA.

HUB OF VEHICLE-WHEELS.

1,268,629.

Specification of Letters Patent.  Patented June 4, 1918.

Application filed October 29, 1915. Serial No. 58,704.

*To all whom it may concern:*

Be it known that we, ALBERT EDWARD RUSSELL, a citizen of the United States of America, and WALTER GEORGE CHARLEY, a subject of the King of Great Britain and Ireland, and residents, respectively, of 77 Henry street, Windsor, in the State of Victoria, Commonwealth of Australia, and of 454 Collins street, Melbourne, in the State of Victoria, Commonwealth of Australia, have invented certain new and useful Improvements in or Connected with Hubs of Vehicle-Wheels; and we do declare the following to be a full, clear, and exact description of the invention, such as will enable others skilled in the art to which it appertains to make and use the same.

This invention has been devised to provide improvements relating to wheels of vehicles and by the peculiarly arranged and constructed parts embodied in our invention the wheel combines a high degree of resiliency with safety and longevity in its working.

In order that our invention may be the more easily understood, reference may be made to the accompanying drawings, in which, for an example, we illustrate our improvements applied in one form to a motor car wheel. In the drawings—

Figure 1 is an elevation of a wheel embodying our invention.

Fig. 2 a transverse section to a larger scale of the hub portion of a front wheel taken on line 1—2 of Fig. 1.

Fig. 3 a transverse section of the hub of a rear wheel embodying our improvements.

Fig. 4 a section taken at the line 3—4 on Fig. 2, while—

Fig. 5 shows a section taken at the line 5—6 on Fig. 3, and illustrates the insert ring of resilient material hereinafter referred to.

In carrying our invention into effect it will be seen from the drawings that we employ two plate rings or perforated disks $a$—$a$, between each of which said plate rings $a$—$a$ is placed (preferably vulcanized into one piece with the rings—their inner surfaces being roughened to better grip the rubber—) a corresponding insert ring, washer or perforated disk of india-rubber, or other suitable resilient material $c$.

Upon the plates $a$—$a$ are perforations into which are stanchly fixed the inner heads (preferably riveted) of a plurality of dowels $d$, or alternatively the plates $a$ may be cast with projecting dowels or such dowels $d$ be pressed out from the wrought plate $a$. A set of these plates $a$—$a$ is provided on each side of each wheel $b$ and for this purpose a circular inset $e$ is cut from the main hub plates $b$ to enable the rings or disks $a$ to fit therein. In these hub plates $b$ are also cavities or chambers $d'$ for receiving the dowels $d$ standing out from the plate rings $a$.

In lieu of the metal plate rings or perforated disks $a$—$a$ and added dowels $d$ we may vulcanize the insert ring $c$ so that its outer surfaces are hardened to represent the metal, and similarly the dowels $d$ may be formed integral with the hardened portion.

The outer portion $f$ of each of the plates of the hub proper $b$ is curved outwardly to form an annular rim $g$ to correspond with inwardly turning peripheral rims $h$ on the flange $i'$ of the outer boss $i$ and cover plate $j$. The boss $i$ and the cover plate $j$ have also on their inner sides recesses $d^2$ to correspond respectively with the dowels $d$ projecting from the rings or perforated disks $a$—$a$ aforesaid, the said outer plate $j$ being pressed into position by a plurality of the hexagon heads $k$ of shank bolts $l$ or other suitable means.

It will be noted that the outer cover plate $j$ can thus be screwed tightly against the doweled ring $a$ so as to press the rubber $c$ between the exterior and interior of such rings both at the front and back of the wheel.

Bolts as $m$ and nuts as $m'$ are arranged to pass through and secure together the webbed blocks $n$ of the two hub plates proper $b$, the spokes $b'$ being held by screw pins $b^2$ to form a stanch construction.

A cap piece $o$ may be employed, shaped and arranged to screw on to the threaded end of the forwardly projecting boss $i$ and to cover the boltheads $k$ and form a cup for lubricant (Fig. 2) and a similar cap piece (Fig. 3) used for the back axle where the axle and wheel are keyed together.

In Fig. 3 $t$ represents the brake drum usually attached by bolts $t'$ to the inner side of the hubs of back wheels.

In the drawings (see Fig. 2) channels and collars may be left for ball races at $p$ to receive the axle (not shown), but it is obvious that any approved form of bearing may be used without affecting the value of the invention.

In Fig. 3 the boss $i$ is grooved at $r$ to receive a key (see also Fig. 5).

Reverting to the front cover plate $j$, its peripheral rim $h$ is curved as aforesaid so that it reaches backwardly to within a close distance of the outwardly projecting peripheral rim $g$ of the hub plate $b$ at the portion marked $f$ hereinbefore referred to, the distance being so calculated that upon the tire receiving a diagonal thrust the two peripheral edges $g$ and $h$ will meet and prevent any undue diagonal movement of such wheel from its normal vertical line.

We would have it understood that in the construction of a hub embodying our invention we may employ one of the several well known internal sleeves so that same may be added to fit the differential diameters of the axles employed upon any particular car and to thus enable a stock size of hub, constructed according to our invention, to be employed upon axles of varying diameters or lengths.

We reserve to ourselves the right to extend the plates $b$ to the full diameter of the wheel thereby obviating the employment of spokes $b'$, the outer tire being securely placed with its rim upon the exterior or periphery of the said plates $b$. In this latter case a ring would be provided on each of the plates at $f$ to project and fulfil the functions of the outwardly projecting peripheral rim $g$ hereinbefore referred to, for limiting the diagonal movement of the wheel and for engaging when necessary the parts $h$.

It is obvious that with such slight modifications as would suggest themselves to a skilled tradesman, our improvements can be employed in the construction of vehicle wheels of other types than those for motor vehicles (as above set forth); and where the diameter of the wheel is limited, as for instance in railway vehicles, a plurality of the plate rings $a$ and resilient material $c$ may, if deemed necessary, be employed as an equivalent for the larger diameter of the wheels, the principle of course being always maintained that a ring of rubber or like suitable material is placed between the flanges of the tire sections of the wheel and the flanges of the hub section of the wheel.

In operation, where a wheel embodying our invention is employed, and the tire, which may be of the solid or airless or metallic description, receives blows from its concussion with the obstacles and inequalities in the road, the shocks, jolts or vibrations are transmitted through the inner plate rings $a$ to the rubber insert $c$ whence they are dulled, dissipated or absorbed. The boss flange $i'$ and cover plate $j$ are thus cushioned so that a condition of resiliency is imparted to the axle. We are thus enabled to employ a tire of a hard or comparatively hard structure and still give to a vehicle the comfort and other advantages derived from the employment of pneumatic tires.

Alternatively we enable a motor wheel for instance to employ a pneumatic tire in a highly compressed condition and receive from it a degree of comfort that would arise were the tire in the ordinary way to be used in a less compressed condition. The highly compressed tire, as is known, has a longer life and mileage than a similar tire compressed to a lesser degree.

We claim:—

1. A vehicle wheel comprising in combination, a member associated with the hub of the wheel, a member associated with the rim of the wheel, a cushioning element in the form of an annular disk interposed between said members and consisting of an interior annular resilient portion and exterior annular unresilient portions, said interior and exterior portions being connected and forming a unitary integral whole, and means for preventing relative radial movement between each of the unresilient portions and the adjacent one of said members.

2. A vehicle wheel comprising in combination, a member associated with the hub of the wheel, a member associated with the rim of the wheel, a cushioning element in the form of an annular disk interposed between said members and consisting of an interior annular resilient portion and exterior annular unresilient portions, said interior and exterior portions being connected and forming a unitary integral whole, and means for preventing relative radial and rotational movement between each of the unresilient portions and the adjacent one of said members.

3. A vehicle wheel comprising in combination, a member associated with the hub of the wheel, a member associated with the rim of the wheel, an annular cushioning element interposed between said members and consisting of an annular disk of resilient material, arranged between a pair of annular disks of unresilient material, the resilient and unresilient disks being united to each other to form an integral unitary whole, and means for preventing relative radial movement between each of the last mentioned disks and the adjacent one of said members.

4. A vehicle wheel, comprising in combination, a pair of members associated with the hub of the wheel, a central member associated with the rim of the wheel and arranged between said hub members, an annular cushioning element interposed between said central member and each of said hub members, each cushioning element consisting of an annular disk of resilient material arranged between and united to a pair of annular disks of unresilient material, and means for preventing relative radial movement between the hub and central members and the adjacent unresilient annular disks.

5. A vehicle wheel, comprising in combination, a pair of members associated with the hub of the wheel, a central member associated with the rim of the wheel and arranged between said hub members, an annular cushioning element interposed between said central member and each of said hub members, each cushioning element consisting of an annular disk of resilient material arranged between and united to a pair of annular disks of unresilient material, and means for preventing relative radial and rotational movement between the hub and central members and the adjacent unresilient annular disks.

6. A vehicle wheel, comprising in combination, connected members associated with the hub of the wheel, connected members associated with the rim of the wheel, an annular cushioning element interposed between each hub member and the adjacent rim member, each cushioning element consisting of an annular disk of resilient material arranged between and united to a pair of annular disks of unresilient material, and means for preventing relative radial movement between the unresilient annular disks of each element and the adjacent rim and hub members.

7. A vehicle wheel, comprising in combination, connected members associated with the hub of the wheel, connected members associated with the rim of the wheel, an annular cushioning element interposed between each hub member and the adjacent rim member, each cushioning element consisting of an annular disk of resilient material arranged between and united to a pair of annular disks of unresilient material, and means for preventing relative radial and rotational movement between the unresilient annular disks of each element and the adjacent rim and hub members.

8. A vehicle wheel, comprising in combination, a member associated with the hub of the wheel, a member associated with the rim of the wheel, an annular cushioning element interposed between said members and consisting of an annular disk of resilient material arranged between and united to a pair of annular disks of unresilient material, and projections on each of said unresilient annular disks, engaging apertures in the adjacent one of said members to prevent relative radial movement between the disk and member.

9. A vehicle wheel, comprising in combination, a member associated with the hub of the wheel, a member associated with the rim of the wheel, an annular cushioning element interposed between said members and prevented from radial movement relatively thereto, said element consisting of an annular disk of resilient material arranged between and united to a pair of annular disks of unresilient material, and projections on each of said unresilient disks, engaging apertures in the adjacent member to prevent relative rotational movement between said disk and member.

10. A vehicle wheel, comprising in combination, a member associated with the hub of the wheel, a member associated with the rim of the wheel, an annular cushioning element interposed between said members and consisting of an annular disk of rubber arranged between and vulcanized to a pair of annular disks of unresilient material, and means for preventing relative radial movement between each of the last mentioned disks and the adjacent one of said members.

11. A vehicle wheel, comprising in combination, a member associated with the hub of the wheel, a member associated with the rim of the wheel, an annular cushioning element interposed between said members and consisting of an annular disk of rubber arranged between and vulcanized to a pair of annular disks of unresilient material, and means for preventing relative radial and rotational movement between each of the last mentioned disks and the adjacent one of said members.

12. A cushioning element for use in vehicle wheels which comprises an annular disk portion of resilient material having on each of its flat surfaces an unresilient disk portion, said unresilient and resilient disk portions being integrally connected to form a unitary whole, the unresilient disk portions being movable relatively to each other in the plane of the element.

13. A cushioning element for use in vehicle wheels, which comprises an annular disk of resilient material having at each of its flat surfaces an annular unresilient disk, said unresilient and resilient disks being united to each other to form a unitary whole, the unresilient disks being movable relatively to each other in the plane of the element.

14. A vehicle wheel comprising in combination, a hub member, an outwardly extending flange thereon, a rim member, an inwardly extending flange thereon, and lying adjacent to the first flange, an annular cushioning element located between said flanges and comprising an annular rubber disk between and secured to annular metal disks, and means extending between each flange and the adjacent metal disk of the cushioning element for preventing relative radial movement between said flange and disk.

In testimony whereof we have signed our names to this specification in the presence of two subscribing witnesses.

ALBERT EDWARD RUSSELL.
WALTER GEORGE CHARLEY.

Witnesses:
 AUGUSTINE T. MADDEN,
 ALICE HARKER.